(12) United States Patent
Nickel et al.

(10) Patent No.: US 10,190,000 B2
(45) Date of Patent: Jan. 29, 2019

(54) SYSTEMS FOR PRODUCING A PLURALITY OF COATING COMPOSITIONS HAVING PREDETERMINED VOC CONTENTS AND METHODS FOR MAKING SUCH SYSTEMS

(71) Applicant: AXALTA COATING SYSTEMS IP CO., LLC, Wilmington, DE (US)

(72) Inventors: Gary W. Nickel, Sewell, NJ (US);
Renee J. Kelly, Media, PA (US);
Yongqing Huang, Wilmington, DE (US); Sheau-Hwa Ma, West Chester, PA (US); Beatriz E. Rodriguez-Douglas, Garnet Valley, PA (US)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 0 days.

(21) Appl. No.: 14/467,842

(22) Filed: Aug. 25, 2014

(65) Prior Publication Data
US 2015/0105512 A1   Apr. 16, 2015

Related U.S. Application Data

(60) Provisional application No. 61/889,334, filed on Oct. 10, 2013.

(51) Int. Cl.
| | |
|---|---|
| *C09D 5/00* | (2006.01) |
| *C08L 67/00* | (2006.01) |
| *C09D 133/06* | (2006.01) |

(52) U.S. Cl.
CPC ........... *C09D 5/00* (2013.01); *C09D 133/066* (2013.01); *C08L 67/00* (2013.01)

(58) Field of Classification Search
CPC ........ C09D 5/00; C09D 133/066; C08L 67/00
USPC .................................................. 524/513, 500
See application file for complete search history.

(56) References Cited

U.S. PATENT DOCUMENTS

| | | | |
|---|---|---|---|
| 7,652,099 B2 * | 1/2010 | Fiori .................... | B05D 5/005 524/501 |
| 2002/0122887 A1 | 9/2002 | Forbes et al. | |
| 2007/0154646 A1 | 7/2007 | Bochnik et al. | |

FOREIGN PATENT DOCUMENTS

| | | |
|---|---|---|
| CA | 2283384 A1 | 9/1998 |
| EP | 1943025 B1 | 5/2014 |

\* cited by examiner

*Primary Examiner* — Kelechi C Egwim
(74) *Attorney, Agent, or Firm* — Lorenz & Kopf, LLP

(57) ABSTRACT

A method of making a system for producing coating compositions having a predetermined VOC content includes preparing a paint comprising a resin and a solvent and having the predetermined VOC content or less. Temperature adjusters are prepared containing a resin and having the predetermined VOC content or less. Each temperature adjuster includes a different solvent or a different amount of a solvent compared to the others such that each of the coating compositions formed from one of the temperature adjusters is suitable for application within an ambient temperature range based on a rate of evaporation of the solvent within the ambient temperature range. Each temperature adjuster has no less than 1 wt. % solids based on the total weight of the temperature adjuster. The paint and the temperature adjusters are provided together as the system.

6 Claims, No Drawings

SYSTEMS FOR PRODUCING A PLURALITY OF COATING COMPOSITIONS HAVING PREDETERMINED VOC CONTENTS AND METHODS FOR MAKING SUCH SYSTEMS

CROSS-REFERENCE TO RELATED APPLICATION

This application claims the benefit of U.S. Provisional Application No. 61/889,334, filed Oct. 10, 2013, which is incorporated herein by reference in its entirety.

TECHNICAL FIELD

The technical field generally relates to systems for producing coating compositions and methods for making such systems, and more particularly relates to systems for producing a plurality of coating compositions that have predetermined VOC contents and methods for making such systems.

BACKGROUND

Environmental concerns have resulted in government regulations of volatile organic compounds (VOCs) in paints and coatings. For example, in the United States, many states have passed or are considering passing legislation limiting VOCs in refinish basecoats to no more than 0.42 kilograms (kg) of VOCs/liter of paint (3.5 pounds of VOCs/gallon of paint). Other countries have or will follow suit. Compliance with these regulations is currently possible by using "exempt" solvents that are not included in the calculation of VOCs. VOC exempt solvents do not cause the formation of ground level ozone (smog), according to environmental chemists. Several of the more commercially useful VOC exempt solvents include acetone, methyl acetate, tertiary butyl acetate (TBAc), and P-chlorobenzotriflouride (PCBTF). Water also is considered an exempt solvent.

However, coatings made from these solvents are not always suitable for application, for example, by spraying, in all temperatures. During application of a coating composition, such as a refinish basecoat, it is preferable that the basecoat dry quickly but not so quickly that the basecoat does not have time to flow evenly over the vehicle. There are a limited number of exempt solvents and they do not necessarily have evaporation rates that make them suitable for use in all temperature ranges. For example, if the refinish basecoat is to be sprayed on an automobile at low temperatures, for example, at temperatures in the range of below 21° C. (about 70° F.), a solvent with a slow evaporation rate would evaporate too slowly and would be undesirable in the basecoat. Similarly, if the refinish basecoat is to be sprayed at high temperatures, such as higher than 32° C. (about 90° F.), a solvent with fast evaporation rate would evaporate too quickly for the coating to flow over the automobile and achieve a smooth finish.

Accordingly, it is desirable to provide methods for making systems for producing a plurality of coating compositions with predetermined VOC contents that are suitable for use in predetermined temperature ranges. It also is desirable to provide systems for producing a plurality of such coating compositions. Furthermore, other desirable features and characteristics will become apparent from the subsequent detailed description and the appended claims, taken in conjunction with the accompanying drawings and this background.

BRIEF SUMMARY

Methods for making systems for producing a plurality of coating compositions that have predetermined VOC contents and systems for making a plurality of such coating compositions are provided. In accordance with an exemplary embodiment, a method of making a system for producing a plurality of coating compositions having a predetermined VOC content includes preparing a paint comprising a resin and a solvent and having the predetermined VOC content or less. A plurality of temperature adjusters is prepared. Each of the plurality of temperature adjusters contains a resin and has the predetermined VOC content or less. Each of the plurality of temperature adjusters includes a different solvent or a different amount of a solvent compared to the other of the plurality of temperature adjusters such that each one of the plurality of coating compositions formed from one of the plurality of temperature adjusters is suitable for application within an ambient temperature range based on a rate of evaporation of the solvent within the ambient temperature range. Each of the plurality of temperature adjusters has no less than 1 wt. % solids based on the total weight of the temperature adjuster. The paint and the plurality of temperature adjusters are provided together as the system for producing the plurality of coating compositions. An amount of the paint and an amount of one of the plurality of temperature adjusters are suitable for combining to form one of the plurality of coating compositions.

In accordance with another exemplary embodiment, a system for producing a plurality of coating compositions having a predetermined VOC content includes a binder solution comprising a resin and a solvent, a reducer comprising a solvent with or without a resin, and a plurality of temperature adjusters. Each of the plurality of temperature adjusters contains a resin and has the predetermined VOC content or less. Each of the plurality of temperature adjusters comprises a different solvent or a different amount of a solvent compared to the other of the plurality of temperature adjusters such that each one of the plurality of coating compositions formed from one of the plurality of temperature adjusters is suitable for application within an ambient temperature range based on a rate of evaporation of the solvent within the ambient temperature range. When combined, the binder solution and the reducer form a paint with the predetermined VOC content. An amount of the paint and an amount of one of the plurality of temperature adjusters are suitable for combining to form one of the plurality of coating compositions.

DETAILED DESCRIPTION

The following detailed description is merely exemplary in nature and is not intended to limit the various embodiments or the application and uses thereof. Furthermore, there is no intention to be bound by any theory presented in the preceding background or the following detailed description.

Various embodiments for methods of making systems for producing a plurality of coating compositions having a predetermined VOC content and systems for making a plurality of coating compositions having a predetermined VOC content are described herein. The systems are manufactured for producing a plurality of coating compositions having a predetermined VOC content. As used herein, when a component has a "predetermined VOC content," the component has a VOC content that is selected prior to the component being manufactured. In this regard, the component is manufactured so that it has the selected VOC content. For example, the predetermined VOC content can be selected from the range of from about 0.21 kilograms (kg) of VOCs/liter (l) of component to about 0.48 kg/l (about 1.8 to about 4.0 pounds (lb.) of VOCs/gallon (gal.) of component), for example, in the range of from about 0.25 kg/l component to about 0.45 kg/l (about 2.1 lbs./gal to about 3.8 lbs./gal), such as about 0.34 kg/l of component to 0.42 kg/l (about 2.8 lbs./gal to about 3.5 lbs./gal).

The systems generally include a paint that has the predetermined VOC content or less. In addition, the systems contain a plurality of temperature adjusters that each has a balance of solvents and resins. As used herein, the term "resin" means any of a class of nonvolatile, solid or semi-solid organic substances that may consist of amorphous mixtures of natural oil obtained directly from certain plants as exudations, or resins prepared by polymerization of simple molecules. Suitable resins include, but are not limited to, acrylic resins, polyester resins, and cellulosic resins common in the art. Particularly useful hydroxyl-containing acrylic polymers are composed of polymerized monomers of alkyl methacrylates and alkyl acrylates, each having 1-12 carbon atoms in the alkyl groups, isobornyl methacrylate, isobornyl acrylate, hydroxyl alkyl methacrylate and hydroxyl alkyl acrylate, each having 1-4 carbon atoms in the alkyl group, styrene or any mixture of any of the above monomers. These acrylic polymers have a weight average molecular weight of 2,000 to 50,000 and a glass transition temperature (Tg) of from −20° C. to 100° C. Useful polyesters are the esterification product of one or more aliphatic or aromatic polycarboxylic acids, and one or more aliphatic polyols, but may also incorporate anhydrides, monoacids, monoalcohols, or lactones. Useful carboxylic acid or anhydride components include aliphatic diacids having 0-12 carbon atoms between the acid groups, phthalic anhydride, isophthalic acid, terephthalic acid, hexahydrophthalic anhydride, benzoic acid, and coconut fatty acid. Useful hydroxyl components include aliphatic glycols having 0-6 carbon atoms between the hydroxyl groups, glycerine, trimethylolpropane, pentaerythritol, dimethylolpropionic acid, cyclohexanol, and epsilon-caprolactone. The suitable polyester has a weight average molecular weight ranging from 1500 to 20,000 and a Tg in the range of −50° C. to 100° C. Useful cellulosic resins include the cellulose acetate butyrate types and the cellulose acetate propionate types. The resins permit the temperature adjusters to be formulated such that non-exempt solvents may be used in the temperature adjusters while each of the temperature adjusters still meet the predetermined VOC content or less. Each temperature adjuster has a different solvent or mixture of solvents or an amount of solvent(s) so that the resulting coating composition is suitable for film application, film formation, leveling, and drying within a predetermined ambient temperature range. In this regard, a coating composition can be formulated to meet a predetermined VOC content or less and to exhibit a suitable application, film formation, leveling and drying performance for a given ambient temperature.

In accordance with an exemplary embodiment, a method for making a system for producing a plurality of coating compositions having a predetermined VOC content includes preparing a paint having the predetermined VOC content or less and preparing a plurality of temperature adjusters, each having the predetermined VOC content or less. As used herein, the term "coating composition" is used to mean any type of coating applied to a substrate. The substrate can be made of metal, plastic or other polymer materials, wood, ceramic, clay, concrete, stone, or other man-made or natural materials. Examples of suitable substrates include, but are not limited to, a vehicle, such as an automobile or truck; a home appliance, such as a refrigerator, a washing machine, a dishwasher, microwave oven, cooking and baking ovens; electronic appliances, such as television sets, computers, electronic game sets, audio and video equipment, recreational equipment, such as bicycles, ski equipment, and all-terrain vehicles; and home or office furniture, such as tables and file cabinets. The substrate can also have one or more existing coating layers. The coating compositions can include primers, sealers, topcoats, clear-coats, basecoats, one- and two-stage coatings, and the like. As used herein, the term "paint" refers to a composition with or without pigment. In the context of vehicle coating, the coating composition can be used both for vehicle original equipment manufacturing (OEM) coatings and for repairing or refinishing coatings of vehicles and vehicle parts.

In an exemplary embodiment, the paint is formed from resins and solvents. The resins are selected depending, at least in part, on the purpose of the coating composition. For example, if the coating composition is to be a clear coating, a resin of the paint may provide, at least in part, an abrasion-resistance function. The solvents in the paint will include exempt and non-exempt solvents. The relationship between the VOC content and the type and amount of resins and solvents in the paint can be based on a formula, such as that provided by government regulations. For example, in the United States, when VOC-exempt solvents are involved, the following Equation I is used for a given volume of paint:

$$VOC \text{ content (kg/l)} = \frac{(\text{kgs total solvent} - \text{kgs exempt solvents})}{(\text{total liters of paint} - \text{liters of exempt solvents})} \qquad (I)$$

where water is also considered an exempt solvent. If the paint contains resins and solvents and other solids, the Equation I becomes:

$$VOC \text{ content (kg/l)} = \frac{(\text{kgs exempt solvent} + \text{kgs nonexempt solvent} - \text{kgs exempt solvents})}{(\text{l. nonexempt solvent} + \text{l. exempt solvent} + \text{l. resin solids} + \text{l. other solids} - \text{l. exempt solvents})},$$

where kgs means kilograms and l. means liters. When simplified, Equation I becomes:

$$VOC \text{ content (kg/l)} = \frac{(\text{kgs nonexempt solvent})}{(\text{l. nonexempt solvent} + \text{l. resin solids} + \text{l. other solids})}.$$

Thus, as explained in more detail below, if nonexempt solvents are desired in the paint, for example, for their functionality, adding resin to the paint will decrease the VOC content.

In an exemplary embodiment, the paint is formed using a tint. The tint can be packaged as a first component of the system. In one embodiment, the tint has the same predetermined VOC content of the coating composition or has a lower VOC content. In an alternative embodiment, the tint has a VOC content that is higher than the predetermined VOC content. The tint can include a conventional organic or inorganic colored pigment or mixture of pigments that will provide the coating composition with a desired color or special effect selected by a user. Metallic flakes, such as aluminum flakes, special effect pigments, such as coated mica flakes, coated aluminum flakes, or a combination thereof can also be used. The tint is produced by combining the pigments with resins and solvents. The resins can be of the general class of acrylics, polyesters, alkyds and the like and provide the functions of wetting the pigment, aiding in grinding, and facilitating paint compatibility. The solvents are VOC-exempt and non-exempt and can include ketones, such as acetone, methyl ethyl ketone, methyl isobutyl ketone, methyl amyl ketone, methyl isoamyl ketone, and diisobutyl ketone, esters, such as, ethyl acetate, n-butyl acetate, t-butyl acetate, isobutyl acetate, amyl acetate, and ethyl 3-ethoxy propionate, alcohols such as, ethanol, isopropanol, butanol, pentanol, glycol ethers, such as propylene glycol methyl ether, propylene glycol monomethyl ether acetate, propylene glycol monobutyl ether acetate, aromatic hydrocarbons, such as toluene, xylene, and aromatic 100 or aliphatic hydrocarbons, such as heptane, petroleum naphtha, and VM&P naptha (varnish makers and painter naptha). The tint also may include dispersant polymers of the acrylic and/or polyester type with polar, ionic, aromatic, basic, or acidic functional groups. The dispersant polymers are selected for various functions, for example, wetting and/or stabilizing the pigments in the tint. The tint further may include additives such as rheology-imparting materials such as bentonite clays or hydrophobic fumed silica to prevent settling and improve suspension of the pigments. If the VOC content of the tint is predetermined, the various ingredients and amounts of the tint can be selected and calculated using Equation (I) or another suitable VOC content formula that determines the VOC content from VOC exempt and non-exempt solvents and resins.

In an embodiment, the tint is prepared by mixing the pigment, the resins, the solvents, and the dispersants into a mixture. The mixture also may be processed through a grinding mill to grind down the pigment to a fine particle size and coat the pigment particles with the resins and the solvents. Additional resins, solvents and additives then are added to the pigment dispersion to produce the final stable pigment concentration.

In another embodiment, the paint is formed using a binder solution. The binder solution can be packaged as a second component of the system. In an embodiment, the binder solution has the same predetermined VOC content of the coating composition or has a lower VOC content. In an alternative embodiment, the binder solution has a VOC content that is higher than the predetermined VOC content of the coating composition. The binder solution contains, in addition to solvents, binder resins. When a tint is used in the paint, depending on the particular color of the pigment, the binder resins are used to further adjust concentration of the pigment in the coating composition. In addition, the binder solution can include additives, such as those usually used in the paint industry. Examples of such additives are light stabilizers, for example, based on benztriazoles and HALS compounds, flow control agents based on (meth)acrylic homopolymers or silicone oils, rheology-influencing agents, such as hydrophobic fumed silica or polymeric urea compounds, thickeners, such as cross-linked polycarboxylic acid or polyurethanes, anti-foaming agents, wetting agents, and the like. Examples of general chemical classes of suitable resins for use in the binder solution include, but are not limited to, acrylic resins, polyester resins and cellulosic resins common to the art. Particularly useful hydroxyl-containing acrylic polymers are composed of polymerized monomers of alkyl methacrylates and alkyl acrylates, each having 1-12 carbon atoms in the alkyl groups, isobornyl methacrylate, isobornyl acrylate, hydroxyl alkyl methacrylate and hydroxyl alkyl acrylate, each having 1-4 carbon atoms in the alkyl group, styrene or any mixture of any of the above monomers. These acrylic polymers have a weight average molecular weight of 2,000 to 50,000 and a Tg of from −20° C. to 100° C. Useful polyesters are the esterification product of one or more aliphatic or aromatic polycarboxylic acids, and one or more aliphatic polyols, but may also incorporate anhydrides, monoacids, monoalcohols, or lactones. Useful carboxylic acid or anhydride components include aliphatic diacids having 0-12 carbon atoms between the acid groups, phthalic anhydride, isophthalic acid, terephthalic acid, hexahydrophthalic anhydride, benzoic acid, and coconut fatty acid. Useful hydroxyl components include aliphatic glycols having 0-6 carbon atoms between the hydroxyl groups, glycerine, trimethylolpropane, pentaerythritol, dimethylolpropionic acid, cyclohexanol, and epsilon-caprolactone. The suitable polyester has a weight average molecular weight ranging from 1500 to 20,000 and a Tg in the range of −50° C. to 100° C. Useful cellulosic resins include the cellulose acetate butyrate types and the cellulose acetate propionate types. The solvents are VOC-exempt and non-exempt and can include ketones, such as acetone, methyl ethyl ketone, methyl isobutyl ketone, methyl amyl ketone, methyl isoamyl ketone, and diisobutyl ketone, esters, such as, ethyl acetate, n-butyl acetate, t-butyl acetate, isobutyl acetate, amyl acetate, and ethyl 3-ethoxy propionate, alcohols such as, ethanol, isopropanol, butanol, pentanol, glycol ethers, such as propylene glycol methyl ether, propylene glycol monomethyl ether acetate, propylene glycol monobutyl ether acetate, aromatic hydrocarbons, such as toluene, xylene, and aromatic 100, or aliphatic hydrocarbons, such as heptane, petroleum napththa, and VM&P naptha. If the VOC content of the binder solution is predetermined, the various ingredients and amounts of the binder solution are selected and calculated using Equation I or another suitable VOC content formula that determines the VOC content from VOC exempt and non-exempt solvents and resins.

The paint also is prepared using a reducer, according to another embodiment. The reducer can be packaged as a third component of the system. In an embodiment, the reducer has the same predetermined VOC content of the coating composition or has a lower VOC content. In an alternative embodiment, the reducer has a higher VOC content than the predetermined VOC content of the coating composition. The reducer is predominantly solvent, such as, for example, all exempt solvents, and is used to further dilute the pigment and/or functional resins in the tint and/or the binder solution. In the case where the non-VOC exempt solvent content of the chosen reducer is already relatively low, merely by adding a small amount of resin to the solvent of the reducer, the VOC content of the reducer can be reduced so that the VOC content of the reducer achieves the predetermined VOC content or less. The solvents are VOC-exempt and non-exempt and can include ketones, such as acetone, methyl ethyl ketone, methyl isobutyl ketone, methyl amyl ketone, methyl isoamyl ketone, and diisobutyl ketone, esters, such as, ethyl acetate, n-butyl acetate, t-butyl acetate, isobutyl acetate, amylacetate,and ethyl 3-ethoxy propionate, alcohols such as, ethanol, isopropanol, butanol, pentanol, glycol ethers, such as propylene glycol methyl ether, propylene glycol monomethyl ether acetate, propylene glycol monobutyl ether acetate, aromatic hydrocarbons, such as toluene, xylene, and aromatic 100 or aliphatic hydrocarbons, such as heptane, petroleum naptha, and VM&P naptha. Suitable resins include, but are not limited to, very low VOC acrylic resins, or polyesters resins, or flow-imparting resins such as acrylic or polyester plasticizers. In one embodiment, the reducer is about 96 wt. % solvent. In another embodiment, the reducer is about 98 wt. % solvent. In another embodiment, the reducer is about 100 wt. % solvent.

In an embodiment, the tint, the binder solution, and/or the reducer are combined, in any suitable ratio and in any sequence, to form the paint. The paint can be mixed using any suitable method to combine the ingredients, such as high shear mixing, stirring, agitation, blending, or any combination thereof. In one embodiment, where each component has the predetermined VOC content or less, the components can be blended according to a predetermined formula or recipe to achieve a desired color or for a particular functional application (i.e., as a primer, a clearcoat, etc.) and still result in a paint with the predetermined VOC content. While in one embodiment, the paint is formed by combining the tint, the binder solution, and the reducer, it will be appreciated that the solvents, the resins, and other ingredients of these three components may not necessarily be separated into three such components but may be divided among two components or four or more components and then may be mixed together to form the paint. For example, when the paint is a clearcoat and no pigment will be used in a tint, the resins and solvents that would normally be used in the tint can be used in the binder solution, and only the binder solution and the reducer would be combined to form the paint.

As noted above, the method for making a system for producing a coating composition having a predetermined VOC content also includes preparing a plurality of temperature adjusters, each having the predetermined VOC content or less. The temperature adjusters can be packaged as a fourth component of the system. The function of the temperature adjusters is to further dilute the paint to the extent suitable for application, and to complete the full resin composition to achieve the desired color balance, enhance adhesion, improve rheology, speed drying, and the like. During application of a coating composition, it is preferable that the coating composition dry quickly but not so quickly that the basecoat does not have time to flow evenly over the substrate. Also as mentioned above, in the United States, there are relatively few exempt solvents and they do not necessarily have evaporation rates that make them suitable for use in all temperature ranges. This limited number of exempt solvents makes forming temperature adjusters that meet low VOC content limits difficult. Accordingly, the system for producing a coating composition is made with several temperatures adjusters, each temperature adjuster containing a solvent or mixture of solvents or an amount of solvent(s) that are preferable for use in a coating composition for application at a prescribed temperature range. For example, the system may be manufactured to include three temperature adjusters. A first temperature adjuster may be suitable to make a coating composition for application at temperatures in the range of from about 15° C. to about 24° C. (about 59° F. to about 75° F.), a second temperature adjuster may be suitable to make a coating composition for application at temperatures in the range 24° C. to about 32° C. (75° F. to about 90° F.), and a third temperature adjuster may be suitable to make a coating composition for application at temperatures above 32° C. (about 90° F.). Of course, the system may contain two, four or more temperature adjusters in other embodiments.

Solvents selected for use within the various temperature ranges may not be exempt solvents and, thus, are likely to have VOC contents beyond the predetermined VOC content. Accordingly, Equation I above, or another suitable VOC content formula, can be used to determine the amount of resins to be used in the temperature adjusters to achieve the predetermined VOC content or less. The resins themselves can be selected based on their functionality, such as their ability to balance color, enhance adhesion, improve rheology, speed drying, and the like. Resins that are not themselves packaged with non-exempt solvents, that is, that will not add non-exempt solvents with their own addition, are particularly suitable for use in the temperature adjusters. For example, powdered resins are preferred. The solvents are VOC-exempt and non-exempt and can include ketones, such as acetone, methyl ethyl ketone, methyl isobutyl ketone, methyl amyl ketone, methyl isoamyl ketone, and diisobutyl ketone, esters, such as, ethyl acetate, n-butyl acetate, t-butyl acetate, isobutyl acetate, amyl acetate, and ethyl 3-ethoxy propionate, alcohols such as, ethanol, isopropanol, butanol, pentnol, glycol ethers, such as propylene glycol methyl ether, propylene glycol monomethyl ether acetate, propylene glycol monobutyl ether acetate, aromatic hydrocarbons, such as toluene, xylene, and aromatic 100, or aliphatic hydrocarbons, such as heptane, petroleum naptha, and VM&P naptha. Suitable resins include, but are not limited to, acrylic resins, polyester resins, and cellulosic resins common to the art. Particularly useful hydroxyl-containing acrylic polymers are composed of polymerized monomers of alkyl methacrylates and alkyl acrylates, each having 1-12 carbon atoms in the alkyl groups, isobornyl methacrylate, isobornyl acrylate, hydroxyl alkyl methacrylate and hydroxyl alkyl acrylate, each having 1-4 carbon atoms in the alkyl group, styrene or any mixture of any of the above monomers. These acrylic polymers have a weight average molecular weight of 2,000 to 50,000 and a Tg of from −20° C. to 100° C. Useful polyesters are the esterification product of one or more aliphatic or aromatic polycarboxylic acids, and one or more aliphatic polyols, but may also incorporate anhydrides, monoacids, monoalcohols, or lactones. Useful carboxylic acid or anhydride components include aliphatic diacids having 0-12 carbon atoms between the acid groups, phthalic anhydride, isophthalic acid, terephthalic acid, hexahydrophthalic anhydride, benzoic acid, and coconut fatty acid. Useful hydroxyl components include aliphatic glycols having 0-6 carbon atoms between the hydroxyl groups, glycerine, trimethylolpropane, pentaerythritol, dimethylolpropionic acid, cyclohexanol, and epsilon-caprolactone. The suitable polyester has a weight average molecular weight ranging from 1500 to 20,000 and a Tg in the range of −50° C. to 100° C. Useful cellulosic resins include the cellulose acetate butyrate types and the cellulose acetate propionate types. The temperature adjusters further may include additives, such as those usually used in the paint industry. Examples of such additives are light stabilizers, for example, based on benztriazoles and HALS compounds, flow control agents based on (meth)acrylic homopolymers or silicon oils, rheology-influencing agents, such as hydrophobic fumed silica or polymeric urea compounds, thickeners, such as cross-linked polycarboxylic acid or polyurethanes, antifoaming agents, wetting agents, and the like. The amount of resins and solvents in each of the temperature adjusters are such that each of the temperature adjusters has no less than 1 wt. % solids based on the entire weight of the temperature adjuster, for example, no less than 4% solids, such as no less than 6% solids.

In another, optional, embodiment, the method for making a system for producing a plurality of coating compositions having a predetermined VOC content includes providing a crosslinking component in the system. The crosslinking component can be packaged as an optional, fifth component of the coating composition. The term "crosslinking component" refers to a component having "crosslinking functional groups" that are functional groups positioned in each molecule of the component, wherein these functional groups are capable of crosslinking with other functional groups in the coating composition (during the curing step) to produce a coating in the form of crosslinked structures.

Suitable crosslinking functional groups can include isocyanate, thioisocyanate, alkylated melamine formaldehyde, acetoacetoxy, carboxyl, primary amine, secondary amine, epoxy, anhydride, ketamine, aldimine, or a workable combination thereof. In an exemplary embodiment, the crosslinking component is polyisocyanate.

In another exemplary embodiment, a system for producing a plurality of coating compositions contains the tint, the binder solution, the reducer, the plurality of temperature adjusters, and the optional crosslinking component, as contemplated above, all packaged together and/or sold together and/or otherwise formulated or manufactured to be combined to produce a coating composition as contemplated herein. In another embodiment, the system is packaged with a plurality of tints so that coating compositions of a variety of colors and special effects can be produced using the binder solution, the reducer, the plurality of temperature adjusters, and the optional crosslinking component.

In a further exemplary embodiment, a method of making a coating composition includes forming a paint. The paint is formed by combining a binder solution, a reducer, and optionally a tint, as contemplated above, in amounts or ratios and sequence according to a predetermined formula for obtaining a coating composition having a predetermined color, special effect, or function. The paint can be mixed using any suitable method to combine the ingredients, such as high shear mixing, stirring, agitation, blending, or any combination thereof. While in one embodiment, the paint is formed by combining the tint, the binder solution, and the reducer, it will be appreciated that the solvents, the resins, and other ingredients of these three components may not necessarily be separated into three such components but may be divided among two components or four or more components and then may be mixed together to form the paint. For example, for a clearcoat, pigment in the tint may not be used. Accordingly, other necessary resins and solvents in the tint can be divided between the binder solution and the reducer and the paint can be formed from just these two components.

The method further includes selecting a temperature adjuster from a plurality of temperature adjusters based on the temperature at which the resulting coating composition will be applied. Application of the coating composition can be accomplished at ambient temperatures, such as temperatures in a range of from about 18° C. to about 43° C. Thus, as described above, for ambient temperatures in a range of from about 18° C. to about 43° C., a first temperature adjuster may be suitable to make a coating composition for application at temperatures in the range of from below about 24° C. (about 75° F.), a second temperature adjuster may be suitable to make a coating composition for application at temperatures in the range of from 24° C. to about 32° C. (75° F. to about 90° F.), and a third temperature adjuster may be suitable to make a coating composition for application at temperatures above 32° C. (about 90° F.). Of course, the system may contain two, four or more temperature adjusters in other embodiments.

Once the temperature adjuster is selected for the temperature at which the coating composition is to be applied, the method continues with the mixing of the paint and the temperature adjuster. The paint and temperature adjuster are combined in amounts or ratios according to the predetermined formula for obtaining a coating composition having a predetermined color, special effect, or function. For example, the paint and the temperature adjuster can be combined in a predetermined ratio in the range of from about 4:1 to about 1:4 by volume, for example, from about 2:1 to about 1:2 by volume. The paint can be mixed using any suitable method to combine the ingredients, such as high shear mixing, stirring, agitation, blending, or any combination thereof. In an exemplary embodiment, the tint, the binder solution, the reducer and each of the temperature adjusters have a VOC content at the predetermined VOC content or less. In another embodiment, the tint, the binder solution, the reducer and/or the temperature adjusters have a VOC content above the predetermined VOC content but their presence in the coating composition is substantially insignificant such that the resulting coating composition still exhibits the predetermined VOC content or less. Thus, an end-user, such as an autobody refinisher, need not worry about meeting country or local VOC regulations upon formulating the coating composition as any coating composition created using the system will meet such regulations. An optional crosslinking component can also be added to the coating composition to facilitate crosslinking of the composition.

Next, the coating composition is applied to a substrate and dried. The coating composition can be applied by conventional techniques, such as spraying, electrostatic spraying, dipping, brushing, and flow coating. The coating composition can be applied to a thickness in the range of from about 2.54 microns (μm) to about 254 μm (about 0.1 to about 10 mils), for example, from about 12.7 μm to about 76.2 μm (about 0.5 to about 3 mils), and any number of coatings can be applied. Because the coating composition contains a temperature adjuster formulated to facilitate application, leveling, film formation, and drying at the temperature at which application is occurring, the coating composition dries (or cures, as the case may be) relatively quickly and evenly.

While the above embodiments describe the coating composition formed with the paint combined with a temperature adjuster, it is important to note that the coating composition is not so limited. Rather, the coating composition can be formed, in other embodiments, with the temperature adjuster combined first with one or more individual components of the paint, such as with the tint, the binder solution, or the reducer, followed by combination with the remaining components.

The following is an example of a refinish basecoat system, a method for making the system, and a method for producing a silver coating composition having a VOC content less than 0.42 kg/l (3.5 lb/gal). The examples are provided for illustration purposes only and are not meant to limit the various embodiments contemplated herein in any way.

EXAMPLES

Acrylic Resin #1

An acrylic polymer solution was prepared by free-radical copolymerization by charging the following constituents into a polymerization reactor equipped with a thermometer, a heating source, a stirrer, a dropping funnel, a nitrogen purge, and a condenser:

|  | wt. % |
|---|---|
| Portion 1 | |
| Methyl amyl ketone | 27.42 |
| Portion 2 | |
| Butyl acrylate monomer | 31.00 |
| Methacrylic acid monomer | 5.00 |
| Isobornyl acrylate monomer | 20.00 |
| Hydroxy ethyl methacrylate monomer | 7.50 |
| Hydroxy propyl methacrylate monomer | 7.50 |
| Styrene monomer | 29.00 |
| Portion 3 | |
| Di-t-butyl-peroxide | 0.55 |
| Methyl amyl ketone | 30.85 |
| TOTAL | 158.82 |

Portion 1 was added to the reactor and heated to its reflux temperature. Portion 2 was premixed and then added at a uniform rate to the reactor over 195 minutes while the resulting reaction mixture was maintained at its reflux temperature. Portion 3 was premixed and added to the reactor over a period of 200 minutes at a uniform rate while maintaining the reaction mixture at its reflux temperature. The reaction mixture was held at its reflux temperature for an additional 2 hours.

The resulting acrylic polymer solution had a polymer solids content of about 63 wt. % and a Gardner-Holdt viscosity of Z.

Acrylic Resin #2

An acrylic polymer solution was prepared by free-radical copolymerization by charging the following constituents into a polymerization reactor equipped with a thermometer, a heating source, a stirrer, a dropping funnel, a nitrogen purge, and a condenser:

|  | wt. % |
|---|---|
| Portion 1 | |
| T-butylacetate | 13.70 |
| Portion 2 | |
| Methyl methacrylate monomer | 14.60 |
| N-butyl acrylate monomer | 14.60 |
| 2-Ethylhexyl methacrylate monomer | 11.70 |
| Hydroxy ethyl methacrylate monomer | 11.70 |
| Styrene monomer | 5.90 |
| T-butylacetate | 1.20 |
| Portion 3 | |
| Vazo ® 67 | 3.40 |
| T-butylacetate | 23.20 |
| TOTAL | 158.82, | where Vazo® 67 is 2,2'azobis-(2-methylbutyronitrile) available from E.I. DuPont de Nemours and Co., Wilmington, Del. Portion 1 was added to the reactor and heated to its reflux temperature. Portion 2 was premixed and then added at a uniform rate to the reactor over 360 minutes while the resulting reaction mixture was maintained at its reflux temperature. Portion 3 was premixed and simultaneously added to the reactor with Portion 2. Portion 3 was added over a period of 390 minutes. The reaction mixture was held at its reflux temperature for an additional 60 minutes and then cooled to room temperature. The resulting acrylic polymer solution had a polymer solids content of about 60 wt. % and a Gardner-Holdt viscosity Y+1/4.

Rheology Control Agent in Acrylic Resin #2

Approximately 1.7 wt. % of benzyl amine, available from BASF of Florham Park, N.J., was mixed with about 1.34 wt. % of 1.6 hexamethylene diisocyanate in the presence of 96.36 wt. % of the Acrylic Resin #2. The reaction was stirred for 5 minutes.

Polyester Resin

A copolyester polyol was synthesized by esterifying dimethylolpropionic acid, pentaerythritol, and epsilon-caprolactone. A 12-liter reactor equipped with a mechanical stirrer, a thermocouple, and a short path distillation head with a water separator under nitrogen purge was charged with 2063.4 g. dimethylolpropionic acid (DMPA), 167.1 g. pentaerythritol (PE), 31.0 g. tin (II) 2-ethylhexanoate, and 108.3 g. xylene. The reaction mixture was heated to its reflux temperature and the water of reaction was collected from the water separator. The reaction progress was monitored by the amount of water collected, and the reaction temperature was not allowed to exceed 185° C. An additional 20 g of xylene was added throughout the reaction to maintain the reflux temperature below 185° C. When the amount of water collected approached theoretical (277 g), acid number measurements were used to determine the end point, which was an acid number of less than 5. At a measured acid number of 1.7, the reactor was allowed to cool to 120° C. Then 4126.8 g of epsilon-caprolactone was added slowly over a 15-20 minute period through an addition funnel The reactor was held at 120° C. until the solids exceeded 95%. Then the reactor was allowed to cool to 90° C. and the resulting polymer solution was thinned with 1391.8 g methyl amyl ketone. Forced air was used to cool the reactor to below 50° C.

The polymer solution had 80.2 wt. % solids content, a Gardner Holdt viscosity of V+1/4, and the final acid number was 2.1 corrected for solids. The Polyester Resin was further reduced to 65.5 wt. % solids content by the further addition of methyl amyl ketone.

The various components of a paint of the silver coating composition were then produced according to the following formulas and with the relative predetermined VOC contents:

| Aluminum Tint | |
|---|---|
|  | (wt. %) |
| Acrylic resin #1 | 27.192 |
| Acrylic resin #2 | 20.752 |
| Aluminum paste 7768N from Toyo Aluminum | 23.845 |
| Dispersion of Bentone 27 clay from Elementis Specialties, Inc. | 14.286 |
| Methyl amyl ketone | 5.000 |
| Ethyl 3-ethoxy propionate | 4.100 |
| t-Butyl acetate | 4.825 |
| TOTAL | 100.000, | where Aluminum past 7768N is available from Toyo Aluminum K.K. of Japan and Bentone 27 clay is available from Elementis Specialties, Inc. of East Windsor, N.J.

$$VOC \text{ content} = \frac{(1.982 \text{ kg total solvent} - 0.806 \text{ kg exempt solvent})}{(3.785 \text{ l} - 0.939 \text{ l exempt solvent})} = 0.413 \text{ kg/l}.$$

| Binder Solution | |
| --- | --- |
| | (wt. %) |
| Acrylic resin #1 | 31.638 |
| Acrylic resin #2 | 21.548 |
| Ethyl 3-ethoxy propionate | 10.900 |
| t-Butyl acetate | 35.914 |
| TOTAL | 100.000 |

$$VOC \text{ content} = \frac{(2.366 \text{ kg total solvent} - 1.562 \text{ kg exempt solvent})}{(3.785 \text{ l} - 1.813 \text{ l exempt solvent})} = 0.408 \text{ kg/l}.$$

| Reducer #1 (At or Below Predetermined VOC Content) | |
| --- | --- |
| | (wt. %) |
| t-Butyl acetate | 98.919 |
| Acrylic resin #2 | 1.081 |
| TOTAL | 100.000 |

$$VOC \text{ content} = \frac{(3.243 \text{ kg total solvent} - 3.227 \text{ kg exempt solvent})}{(3.785 \text{ l} - 3.745 \text{ l exempt solvent})} = 0.400 \text{ kg/l}.$$

| Reducer #2 (Above Predetermined VOC Content) | |
| --- | --- |
| | (wt. %) |
| t-Butyl acetate | 100.000 |
| TOTAL | 100.000 |

$$VOC \text{ content} = \frac{(3.260 \text{ kg total solvent} - 3.244 \text{ kg exempt solvent})}{(3.785 \text{ l} - 3.764 \text{ l exempt solvent})} = 0.762 \text{ kg/l}.$$

| Temperature Adjuster No. 1 (Temp. Range about 18 to 27° C.) | |
| --- | --- |
| | (wt. %) |
| SCA in Acrylic Resin #2 | 2.729 |
| Polyester Resin | 1.855 |
| CAB resin 381-0.5 | 1.932 |
| CAB resin 381-0.1 | 1.123 |
| Resamin® HF480 | 0.500 |
| Byk® 361N | 0.167 |
| Diisobutyl ketone | 2.200 |
| Ethyl 3-ethoxy propionate | 1.570 |
| Acetone | 6.110 |
| Benzene, 1-chloro-4(trifluoromethyl) | 81.814 |
| TOTAL | 100.000, | where CAB resin 381-0.5 and 381-0.1 are cellulose acetate butyrates available from Eastman Chemical Co. of Kingsport, Tenn., Resamin HF480 is a carbamic resin available from Allnex of Belgium, and Byk® 361N is a polyacrylate surface additive available from Byk of Germany.

$$VOC \text{ content} = \frac{(4.371 \text{ kg total solvent} - 4.161 \text{ kg exempt solvent})}{(3.785 \text{ l} - 3.274 \text{ l exempt solvent})} = 0.411 \text{ kg/l}.$$

| Temperature Adjuster No. 2 (Temp. Range about 27 to 32° C.) | |
| --- | --- |
| | (wt. %) |
| SCA in Acrylic resin #2 | 1.772 |
| Acrylic resin #2 | 0.963 |
| Polyester resin | 1.851 |
| CAB resin 381-0.5 | 1.926 |
| CAB resin 381-0.1 | 1.119 |
| Resamin® HF480 | 0.498 |
| Byk® 361N | 0.166 |
| Diisobutyl ketone | 1.100 |
| Ethyl 3-ethoxy propionate | 1.035 |
| Ethylene glycol monobutylether acetate | 1.485 |
| Acetone | 6.091 |
| Benzene, 1-chloro-4(trifluoromethyl) | 81.994 |
| TOTAL | 100.000 |

$$VOC \text{ content} = \frac{(4.385 \text{ kg total solvent} - 4.182 \text{ kg exempt solvent})}{(3.785 \text{ l} - 3.293 \text{ l exempt solvent})} = 0.413 \text{ kg/l}.$$

| Temperature Adjuster No. 3 (Temp. Range about 32 to 40° C.) | |
| --- | --- |
| | (wt. %) |
| SCA in acrylic resin #2 | 0.814 |
| Acrylic resin #2 | 1.926 |

| Temperature Adjuster No. 3 (Temp. Range about 32 to 40° C.) | |
|---|---|
| | (wt. %) |
| Polyester resin | 1.846 |
| CAB resin 381-0.5 | 1.920 |
| CAB resin 381-0.1 | 1.116 |
| Resamin ® HF480 | 0.497 |
| Byk ® 361N | 0.165 |
| Ethyl 3-ethoxy propionate | 0.500 |
| Ethylene glycol monobutylether acetate | 2.970 |
| Acetone | 6.072 |
| Benzene, 1-chloro-4(trifluoromethyl) | 82.174 |
| TOTAL | 100.000 |

VOC content =

$$\frac{(4.398 \text{ kg total solvent} - 4.201 \text{ kg exempt solvent})}{(3.785 \text{ l} - 3.308 \text{ l exempt solvent})} = 0.413 \text{ kg/l}.$$

| Temperature Adjuster No. 4 (Temp. Range about 18 to 27° C.) | |
|---|---|
| | (wt. %) |
| SCA in Acrylic Resin #2 | 2.729 |
| Polyester Resin | 1.855 |
| CAB resin 381-0.5 | 1.932 |
| CAB resin 551-0.2 | 1.123 |
| Resamin ® HF480 | 0.500 |
| Byk ® 361N | 0.167 |
| Diisobutyl ketone | 2.200 |
| Ethyl 3-ethoxy propionate | 1.570 |
| Acetone | 6.110 |
| Benzene, 1-chloro-4(trifluoromethyl) | 81.814 |
| TOTAL | 100.000 | where CAB resin 381-0.5 and 551-0.2 are cellulose acetate butyrates available from Eastman Chemical Co. of Kingsport, Tenn., Resamin HF480 is a carbamic resin available from Allnex of Belgium, and Byk® 361N is a polyacrylate surface additive available from Byk of Germany.

VOC content =

$$\frac{(4.368 \text{ kg total solvent} - 4.161 \text{ kg exempt solvent})}{(3.785 \text{ l} - 3.279 \text{ l exempt solvent})} = 0.409 \text{ kg/l}.$$

| Temperature Adjuster No. 5 (Temp. Range about 18 to 27° C.) | |
|---|---|
| | (wt. %) |
| SCA in Acrylic Resin #2 | 2.729 |
| Polyester Resin | 1.855 |
| CAB resin 381-0.5 | 1.932 |
| CAB resin 381-2 | 1.123 |
| Resamin ® HF480 | 0.500 |
| Byk ® 361N | 0.167 |
| Diisobutyl ketone | 2.200 |
| Ethyl 3-ethoxy propionate | 1.570 |
| Acetone | 6.110 |
| Benzene, 1-chloro-4(trifluoromethyl) | 81.814 |
| TOTAL | 100.000 | where CAB resin 381-0.5 and 381-2 are cellulose acetate butyrates available from Eastman Chemical Co. of Kingsport, Tenn., Resamin HF480 is a carbamic resin available from Allnex of Belgium, and Byk® 361N is a polyacrylate surface additive available from Byk of Germany.

VOC content =

$$\frac{(4.372 \text{ kg total solvent} - 4.162 \text{ kg exempt solvent})}{(3.785 \text{ l} - 3.279 \text{ l exempt solvent})} = 0.415 \text{ kg/l}.$$

| Temperature Adjuster No. 6 (Temp. Range about 18 to 27° C.) | |
|---|---|
| | (wt. %) |
| SCA in Acrylic Resin #2 | 3.981 |
| Polyester Resin | 4.003 |
| CAB resin 381-0.5 | 3.415 |
| Resamin ® HF480 | 0.711 |
| Byk ® 361N | 0.236 |
| Diisobutyl ketone | 5.237 |
| Acetone | 6.829 |
| t-Butyl acetate | 14.768 |
| Benzene, 1-chloro-4(trifluoromethyl) | 60.820 |
| TOTAL | 100.000 | where CAB resin 381-0.5 is cellulose acetate butyrate available from Eastman Chemical Co. of Kingsport, Tenn., Resamin HF480 is a carbamic resin available from Allnex of Belgium, and Byk® 361N is a polyacrylate surface additive available from Byk of Germany.

VOC content =

$$\frac{(3.842 \text{ kg total solvent} - 3.558 \text{ kg exempt solvent})}{(3.785 \text{ l} - 3.088 \text{ l exempt solvent})} = 0.407 \text{ kg/l}.$$

| Temperature Adjuster No. 7 (Temp. Range about 27 to 32° C.) | |
|---|---|
| | (wt. %) |
| SCA in Acrylic resin #2 | 3.797 |
| Polyester resin | 3.818 |
| CAB resin 381-0.5 | 3.258 |
| Resamin ® HF480 | 0.678 |
| Byk ® 361N | 0.227 |
| Diisobutyl ketone | 2.326 |
| Ethyl 3-ethoxy propionate | 2.344 |
| Acetone | 6.514 |
| t-Butyl acetate | 7.181 |
| Benzene, 1-chloro-4(trifluoromethyl) | 69.857 |
| TOTAL | 100.000 |

$$VOC \text{ content} = \frac{(4.047 \text{ kg total solvent} - 3.778 \text{ kg exempt solvent})}{(3.785 \text{ l} - 3.128 \text{ l exempt solvent})} = 0.409 \text{ kg/l}.$$

| Temperature Adjuster No. 8 (Temp. Range about 32 to 40° C.) | |
|---|---|
| | (wt. %) |
| SCA in acrylic resin #2 | 3.646 |
| Polyester resin | 3.667 |
| CAB resin 381-0.5 | 3.126 |
| Resamin ® HF480 | 0.650 |
| Byk ® 361N | 0.216 |
| Ethylene glycol monobutylether | 4.384 |
| Acetone | 6.253 |
| Benzene, 1-chloro-4(trifluoromethyl) | 78.058 |
| TOTAL | 100.000 |

$$VOC \text{ content} = \frac{(4.233 \text{ kg total solvent} - 3.970 \text{ kg exempt solvent})}{(3.785 \text{ l} - 3.143 \text{ l exempt solvent})} = 0.410 \text{ kg/l}.$$

| Silver Basecoat Paint No. 1 | |
|---|---|
| | (wt. %) |
| Aluminum Tint | 58.56 |
| Binder Solution | 20.05 |
| Reducer #1 | 21.39 |
| TOTAL | 100.00 |

$$VOC \text{ content} = \frac{(2.372 \text{ kg total solvent} - 1.557 \text{ kg exempt solvent})}{(3.785 \text{ l} - 1.787 \text{ l exempt solvent})} = 0.408 \text{ kg/l}.$$

| Reduced Silver Refinish Basecoat No. 1 | |
|---|---|
| | (wt. %) |
| Silver Basecoat Paint | 28.35 |
| Temperature Adjuster No. 1 | 71.65 |
| TOTAL | 100.00 |

$$VOC \text{ content} = \frac{(3.703 \text{ kg total solvent} - 3.293 \text{ kg exempt solvent})}{(3.785 \text{ l} - 2.780 \text{ l exempt solvent})} = 0.408 \text{ kg/l}.$$

| Silver Basecoat Paint No. 2 | |
|---|---|
| | (wt. %) |
| Aluminum Tint | 48.76 |
| Binder Solution | 6.01 |
| Reducer #1 | 45.23 |
| TOTAL | 100.00 |

$$VOC \text{ content} = \frac{(2.6941 \text{ kg total solvent} - 2.065 \text{ kg exempt solvent})}{(3.785 \text{ l} - 2.380 \text{ l exempt solvent})} = 0.410 \text{ kg/l}.$$

| Reduced Silver Refinish Basecoat No. 2 | |
|---|---|
| | (wt. %) |
| Silver Basecoat Paint No. 2 | 27.72 |
| Temperature Adjuster No. 1 | 72.28 |
| TOTAL | 100.00 |

$$VOC \text{ content} = \frac{(3.794 \text{ kg total solvent} - 3.464 \text{ kg exempt solvent})}{(3.785 \text{ l} - 2.979 \text{ l exempt solvent})} = 0.409 \text{ kg/l}.$$

| Silver Basecoat Paint No. 3 | |
|---|---|
| | (wt. %) |
| Aluminum Tint | 37.45 |
| Binder Solution | 15.31 |
| Reducer #2 | 47.24 |
| TOTAL | 100.00 |

$$VOC \text{ content} = \frac{(2.696 \text{ kg total solvent} - 2.172 \text{ kg exempt solvent})}{(3.785 \text{ l} - 2.507 \text{ l exempt solvent})} = 0.410 \text{ kg/l}.$$

| Reduced Silver Refinish Basecoat No. 3 | |
|---|---|
| | (wt. %) |
| Silver Basecoat Paint No. 3 | 45.45 |
| Temperature Adjuster No. 6 | 54.55 |
| TOTAL | 100.00 |

$$VOC\ \text{content} = \frac{(3.269\ \text{kg total solvent} - 2.865\ \text{kg exempt solvent})}{(3.785\ \text{l} - 2.798\ \text{l exempt solvent})} = 0.409\ \text{kg/l}.$$

Accordingly, various embodiments for systems for producing a plurality of coating compositions having a predetermined VOC content and methods for producing systems for making a plurality of coating compositions having a predetermined VOC content are described herein. While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A three-component system for producing a plurality of coating compositions, the plurality of coating compositions having a predetermined VOC content, the three-component system comprising the following components that are stored separate from one another:
   1) a binder solution comprising a resin and a solvent;
   2) reducer consisting of at least 96 wt.-% solvent and optionally a resin; and
   3) least three temperature adjusters 3a), 3b), and 3c), which are stored separate from one another, wherein each of the at least three temperature adjusters comprises a resin and has the predetermined VOC content or less, and wherein each of the at least three temperature adjusters comprises a different solvent or a different amount of a solvent compared to the others of the at least three temperature adjusters,
   whereby a coating composition formed from a mixture of components 1) and 2) and one of the at least three temperature adjusters 3a)-3c) is configured for application within a different ambient temperature range,
   wherein temperature adjuster 3a) comprises an amount and type of solvent that is configured for application within a first temperature range having a first lower temperature and a first upper temperature, wherein temperature adjuster 3b) comprises an amount and type of solvent that is designed for application within a second temperature range having a second lower temperature that is greater than the first lower temperature and a second upper temperature that is greater than the first upper temperature, and wherein temperature adjuster 3c) comprises an amount and type of solvent that is designed for application within a third temperature range having a third lower temperature that is greater than the second lower temperature and a third upper temperature that is greater than the second upper temperature, and
   wherein each of the at least three temperature adjusters 3a)-3c) has no less than 1 wt. % solids based on a total weight of the temperature adjuster and no more than 14 wt. % solids based on the total weight of the temperature adjuster.

2. The system of claim 1, wherein the binder solution has the predetermined VOC content.

3. The system of claim 1, wherein the reducer has the predetermined VOC content.

4. The system of claim 1, further comprising a tint comprising a pigment, a resin, and a solvent.

5. The system of claim 4, wherein the tint has the predetermined VOC content.

6. The system of claim 1, further comprising a crosslinking component.

* * * * *